June 18, 1935. O. HAEMMERLE 2,005,032
KITCHEN UTENSIL LIFTER
Filed Sept. 28, 1934 2 Sheets-Sheet 1

Inventor
O. Haemmerle
By Clarence A O'Brien
Attorney

June 18, 1935. O. HAEMMERLE 2,005,032
KITCHEN UTENSIL LIFTER
Filed Sept. 28, 1934 2 Sheets-Sheet 2
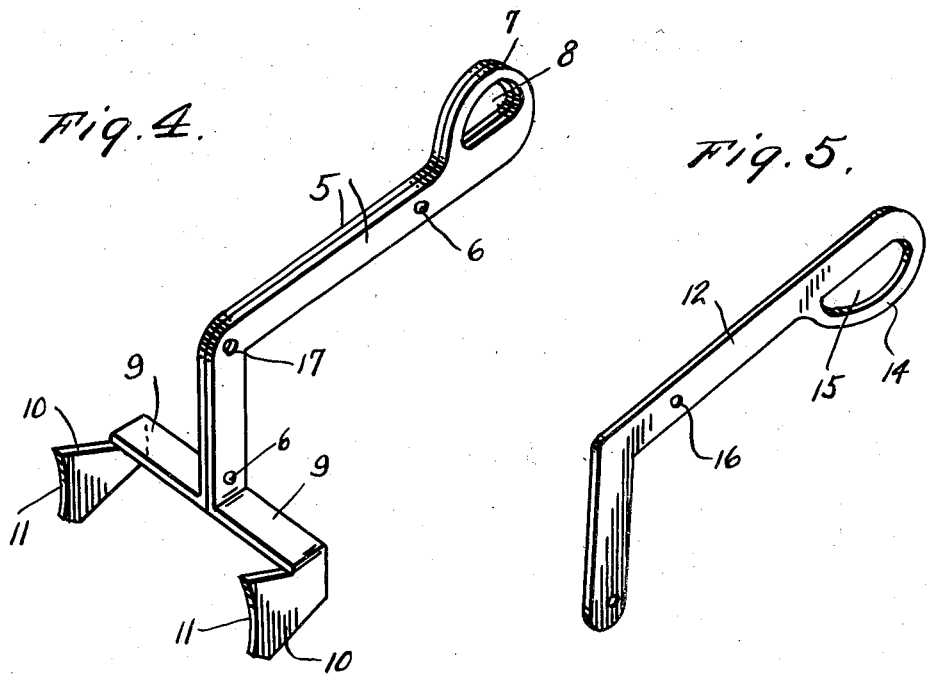
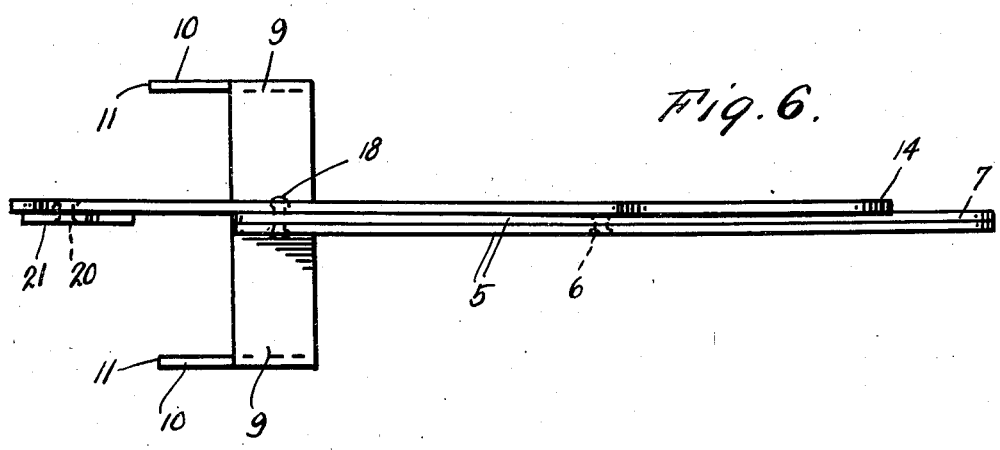
Inventor
O. Haemmerle
By Clarence A. O'Brien
Attorney Patented June 18, 1935

2,005,032

UNITED STATES PATENT OFFICE 2,005,032

KITCHEN UTENSIL LIFTER

Oscar Haemmerle, Union City, N. J.

Application September 28, 1934, Serial No. 745,980

2 Claims. (Cl. 294—31)

The present invention relates to a lifter for pots, pans and other kitchen utensils and the prime object of the invention resides in the provision of a device of this nature which is adaptable to different shapes in kitchen utensils.

Another very important object of the invention resides in the provision of a device of this nature which is exceedingly simple in its construction, strong and durable, easy to manipulate, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 4 is a perspective view of one section of the device.

Figure 5 is a perspective view of the other section of the device.

Figure 6 is a top plan view of the device.

Figure 1:
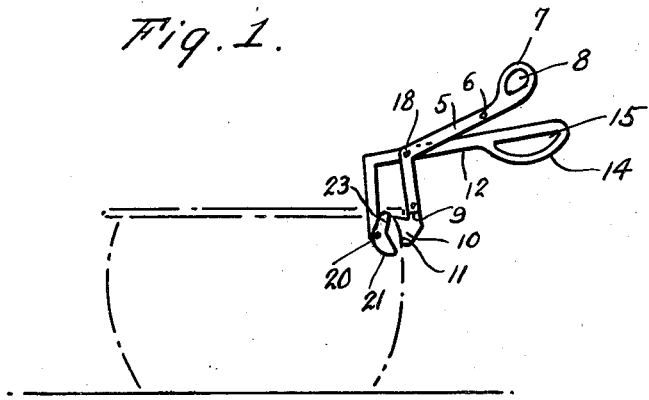
Figure 1 is a side elevation of a device embodying the features of my invention showing the same engaged with a kitchen utensil, the latter being shown in dotted lines.
Figure 3:
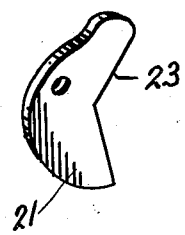
Figure 3 is a perspective view of the pivoted engaging element.
Figure 2:
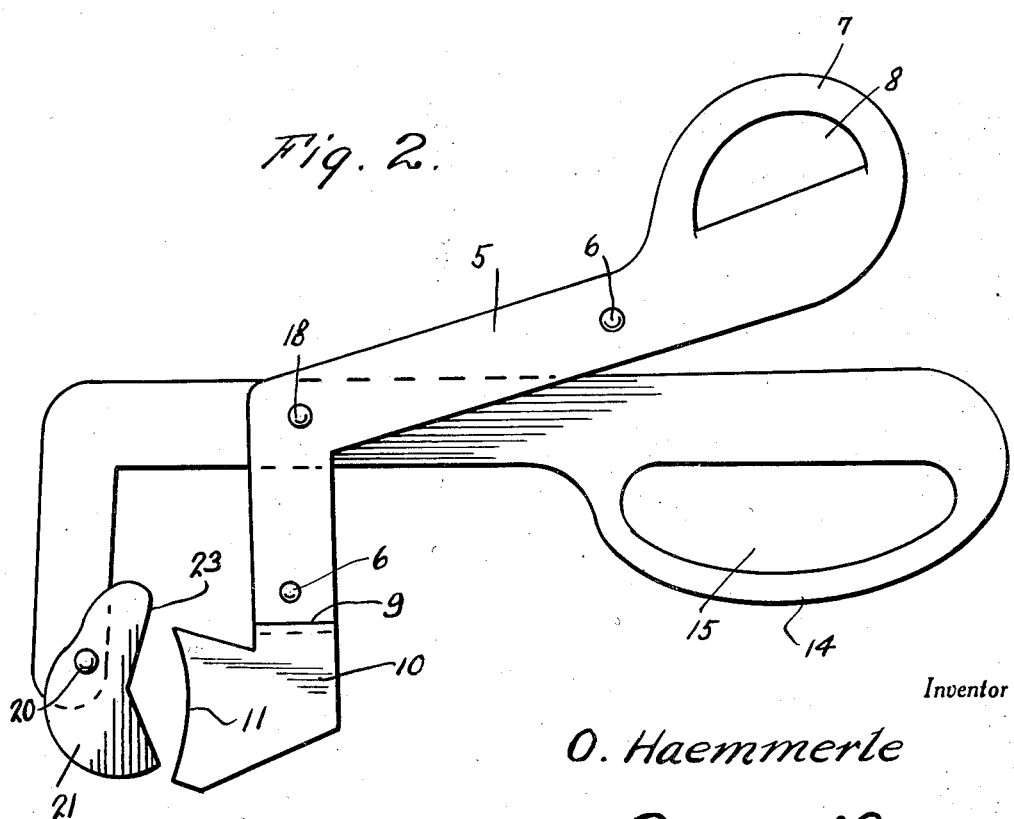
Figure 2 is an enlarged side elevation of the device.

Referring to the drawings in detail it will be seen that numerals 5 denote a pair of L-shaped handle members secured together in abutting coextensive relationship by rivets or other suitable means 6. The longer arms of the members 5 terminate in enlarged ends 7 having openings 8. The shorter arms of the members 5 merge into outwardly and oppositely extending members 9 disposed in close coplanar relationship and in a plane at right angles to the planes of the members 5. The portions 9 at their outer ends merge into plate like engaging elements 10 which depend from the portions 9 at right angles thereto and are extended forwardly therefrom and the forward edges are of a concave arcuate shape as shown at 11.

The other section of the device is in the form of an L-shaped handle member 12, the longer arm of which terminates in an enlarged portion 14 having openings 15. The member 12 is pivoted to the member 5—5 at points 16 and 17. It will be noted that the opening 16 is located intermediate the ends of the longer arm of the member 12 adjacent the shorter arm while the opening 17 is located at the juncture of the shorter and longer arms of member 5—5. A pin 18 extends through these openings 16 and 17 to swingably mount the member 12 on the member 5—5.

On the end of the shorter arm of the member 12 there is pivotally mounted by a suitable pin or like means 20 an engaging plate like element 21. This element 21 has an engaging edge 23 to oppose the edges 11 about midway between them. The edge 23 includes two portions at an obtuse angle.

The manner of use and manipulation of this device is thought to be quite apparent from a mere inspection of the drawings. The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising an L-shaped handle member the shorter arm of which has outwardly extending portions merging into right angularly extending plates with concave-arcuate engaging edges, and a second handle member of L-shaped formation, means pivotally connecting the members at a point on the second member intermediate its longer arm and adjacent its shorter arm and at a point on the first mentioned member at the juncture of its shorter and longer arm, and a pivoted engaging element on the end of the shorter arm of said other member.

2. A device of the class described comprising an L-shaped handle member the shorter arm of which has outwardly extending portions merging into right angularly extending plates with concave-arcuate engaging edges, and a second handle member of L-shaped formation, means pivotally connecting the members at a point on the second member intermediate its longer arm and adjacent its shorter arm and at a point on the first mentioned member at the juncture of its shorter and longer arm, and a pivoted engaging element on the end of the shorter arm of said other member, the first mentioned member being formed of a pair of portions fixed in abutment and coextensive relationship.

OSCAR HAEMMERLE.